United States Patent [19]

Maloney

[11] 4,294,229
[45] Oct. 13, 1981

[54] THERMOSIPHONING MODULE FOR ENVIRONMENTALLY DRIVEN HEATING AND COOLING SYSTEM

[75] Inventor: Timothy Maloney, Mountain Falls, Va.

[73] Assignee: One Design, Inc., Mountain Falls, Va.

[21] Appl. No.: 942,133

[22] Filed: Sep. 13, 1978

Related U.S. Application Data

[63] Continuation-in-part of Ser. No. 941,735, Sep. 12, 1978.

[51] Int. Cl.³ .......................... F24J 3/02; F16K 31/18
[52] U.S. Cl. .................................. 126/434; 126/431; 126/419; 165/485; 137/430
[58] Field of Search ............... 126/422, 428, 430, 431, 126/434, 450, 449, 419; 165/48 S, 49, 168, 169, 106, 32; 137/433, 430

[56] References Cited

U.S. PATENT DOCUMENTS

| | | | |
|---|---|---|---|
| 2,388,940 | 11/1945 | Taylor | 126/434 |
| 3,915,147 | 10/1975 | Rineer | 165/106 X |
| 3,990,635 | 11/1976 | Restle et al. | 126/422 |
| 4,043,317 | 8/1977 | Scharfman | 126/442 |
| 4,050,508 | 9/1977 | Buckley | 126/434 |
| 4,121,565 | 10/1978 | Grisbrook | 126/449 |
| 4,137,964 | 2/1979 | Buckley | 165/32 |
| 4,149,589 | 4/1979 | Hopman | 165/32 |
| 4,155,344 | 5/1979 | Lyon et al. | 126/422 |

Primary Examiner—Larry Jones
Attorney, Agent, or Firm—Finnegan, Henderson, Farabow, Garrett & Dunner

[57] ABSTRACT

The module includes a panel of thermal insulation which facially separates the interior space into an outer, facially large, volumetrically small chamber and an inner volumetrically large chamber. The two chambers are communicated above and below the insulation panel to establish a convection path for the heat transfer liquid. A seasonally reversible check valve provides for unidirectional circulation. The larger chamber is provided with a relatively large surface in contact with the room that is to be heated and cooled.

19 Claims, 5 Drawing Figures

THERMOSIPHONING MODULE FOR ENVIRONMENTALLY DRIVEN HEATING AND COOLING SYSTEM

REFERENCE TO RELATED APPLICATION

This is a continuation in part of my copending patent application Ser. No. 941,735, filed Sept. 12, 1978, entitled Environmentally Driven Heating and Cooling System (One Design, Inc., Dkt. 1).

BACKGROUND OF THE INVENTION

The aforementioned parent application contains extensive bibliographic references which are not repeated here in extenso, but are incorporated herein by reference.

SUMMARY OF THE INVENTION

The aforementioned parent application relates to an environmentally driven heating and cooling system. Several designs of modules for use as at least partially pre-fabricated, field-completed wall portions of such systems are known. The present invention relates to some improved designs of modules for such wall portions, useful in many applications of such systems.

The module includes a panel of thermal insulation which facially separates the interior space into an outer, facially large, volumetrically small chamber and an inner volumetrically large chamber. The two chambers are communicated above and below the insulation panel to establish a convection path for the heat transfer liquid. A seasonally reversible check valve including a floating rod-like member disposed within a slotted tubular member provides for unidirectional circulation. The larger chamber is provided with a relatively large surface in contact with the room that is to be heated and cooled.

The principles of the invention will be further discussed with reference to the drawings wherein preferred embodiments are shown. The specifics illustrated in the drawings are intended to exemplify, rather than limit, aspects of the invention as defined in the claims.

DETAILED DESCRIPTION OF THE PRESENTLY PREFERRED EMBODIMENTS

Figures 1, 2:
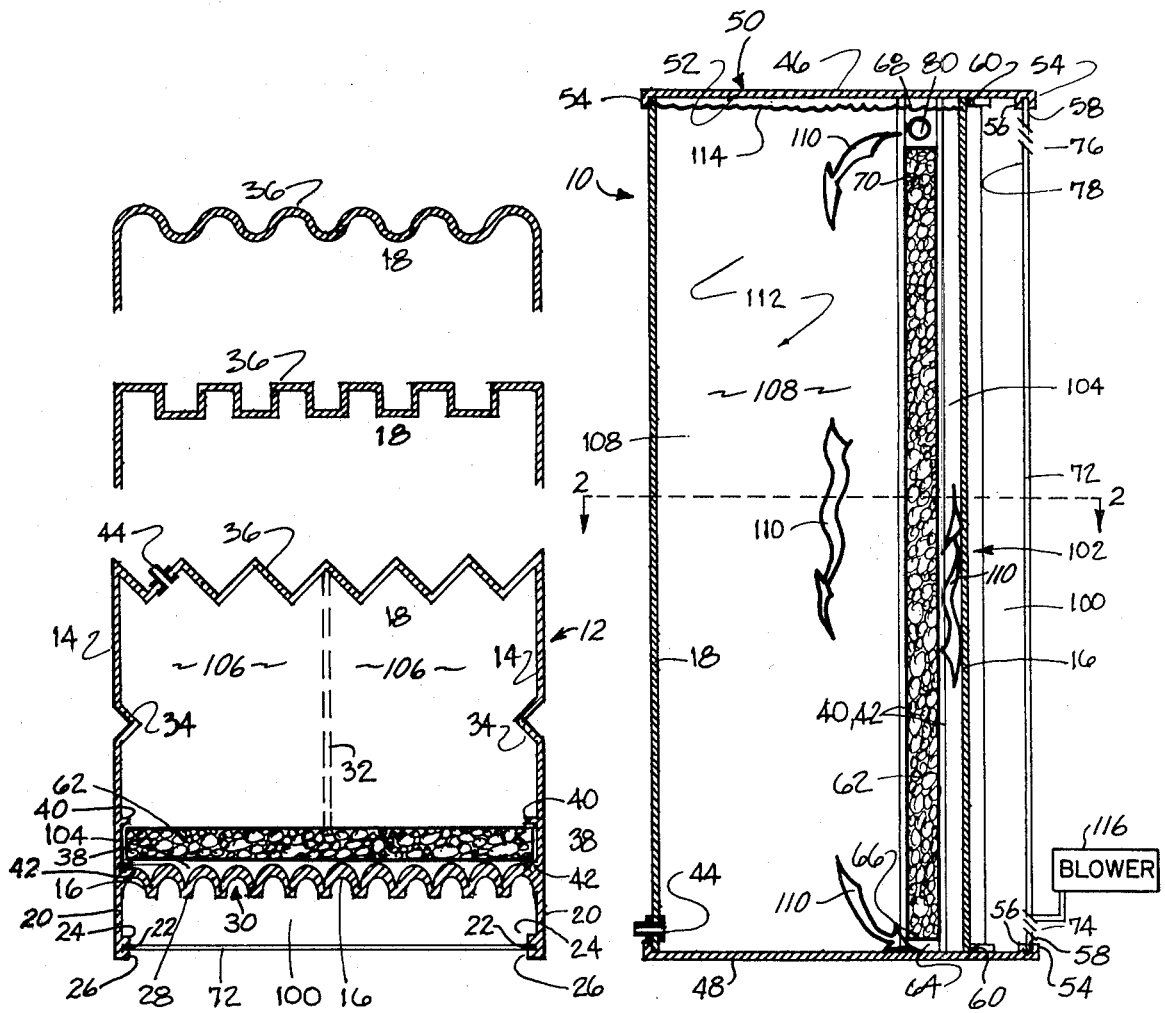
FIG. 1 is a transverse vertical cross-sectional view of a module constructed in accordance with the principles of the present invention.
FIG. 2 is a transverse horizontal cross-sectional view thereof on line 2—2 of FIG. 1.

Each module 10 includes a body comprising a tubular channel member 12, shown in the form of an extrusion which includes two opposed sidewalls 14, a front wall 16 and a rear wall 18. The sidewalls 14 have portions 20 which extend forwardly beyond the front wall 16 and terminate in grooves 22 formed between paired, laterally inwardly extending flanges 24, 26.

In the instance depicted, the front wall 16 is provided with a plurality of parallel ribs or fins 28 on its outer face 30, and a stiffening corrugation 32 which projects rearwardly midway along the width of the front wall 16. The sidewalls are shown provided with similar corrugations at 34 and the rear wall 18 is provided with a whole series of similar corrugations 36, the series extending across the width of the rear wall 18. Although the corrugations 34, 36 preferably are shown being of saw tooth form, any or all of them may be of different figure; for instance they, or any of them, may be of square or sinuous horizontal cross-sectional figure as alternatively shown in FIG. 2.

Behind the front wall 16, the sidewalls are shown provided with respective grooves 38 formed between paired, laterally inwardly extending flanges 40, 42.

Typically the body 12 may be extruded of plastic material or fabricated of sheet material such as plastic or metal, cut to length.

A filler valve may be provided for the body as at 44 (shown in FIG. 2 in the rear wall near the lower end thereof).

The module 10 is also provided with a top wall or cover 46 and a bottom wall or floor 48. The elements 46 and 48, typically may be identical in construction.

In the instance depicted, each of the top and bottom walls 46, 48 includes a central plate 50, perimetrically provided on its inner face 52 with a skirting flange 54. Further, each plate is provided with a first inwardly projecting flange 56 parallel to but behind the flange 54 adjacent the front of the body, so as to define a groove 58. A second transversally extending flange 60 is formed on the inner face of each plate 52 further behind the respective flange 54.

In order to assemble the body as shown, it is necessary either to mill away the upper and lower ends of the fins 28 (as shown) or to slot the flanges 60 (not shown).

Typically, firstly, the tubular channel member 12 is erected on the bottom end wall 48, and these two members are united in a water tight, mechanically interconnected manner, which may involve adhesives, brazing, sonic welding, solvent welding, riveting, seam rolling and/or any similar techniques. Preferably, the connections are facially accomplished between the skirting flange 54 and the abutting end regions of the sidewalls and rear wall 14, 18, and facially between the flange 60 and the abutting end region of the front wall 16.

Further, a panel 62 of rigid thermal insulation material is force-slid downwardly in the grooves 38 until it reaches the relative disposition shown in FIG. 1. Because the panel 62 is somewhat shorter than the body is tall, and pushing of the panel downwards is terminated before the panel engages the bottom wall 48, there remains a gap 64 under the lower end 66 of the panel 62, and a gap 68 over the upper end 70 of the panel.

A glazing panel 72 is slid down in the facing grooves 22 until its lower edge homes in the groove 58 in the bottom wall 48. The glazing panel 72 is of light transmitting, preferably transparent material and preferably includes a lower ventilation port 74 extending nearly thereacross near the lower end thereof, and a similar ventilation port 76 extending nearly thereacross near the upper end thereof. The ports 74, 76 may simply be slots, but preferably they are provided with respective sets of closable/openable shutters or louvers 78.

Caulking and/or other fastening and/or sealing means may be applied in or around the grooves 38, 22 and/or 58 if needed or desired for holding and/or sealing the insulating and/or glazing panels with respect to the body 12.

The cover 46 is installed as shown. In many instances it is sufficiently held in place by gravity and friction and may be simply removed, if need be. However, it may be sealed and/or secured in place much like the bottom wall 48.

Figure 3:
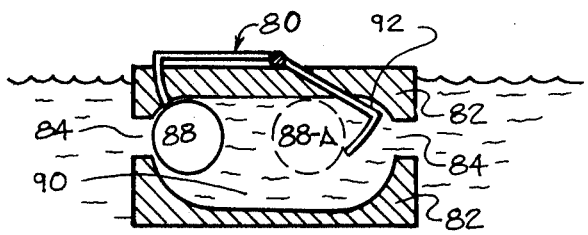
FIG. 3 is a larger scale fragmentary transverse vertical cross-sectional view of an upper portion of the module of FIG. 1, showing the check valve set for northern hemisphere winter operation.
Figure 4:
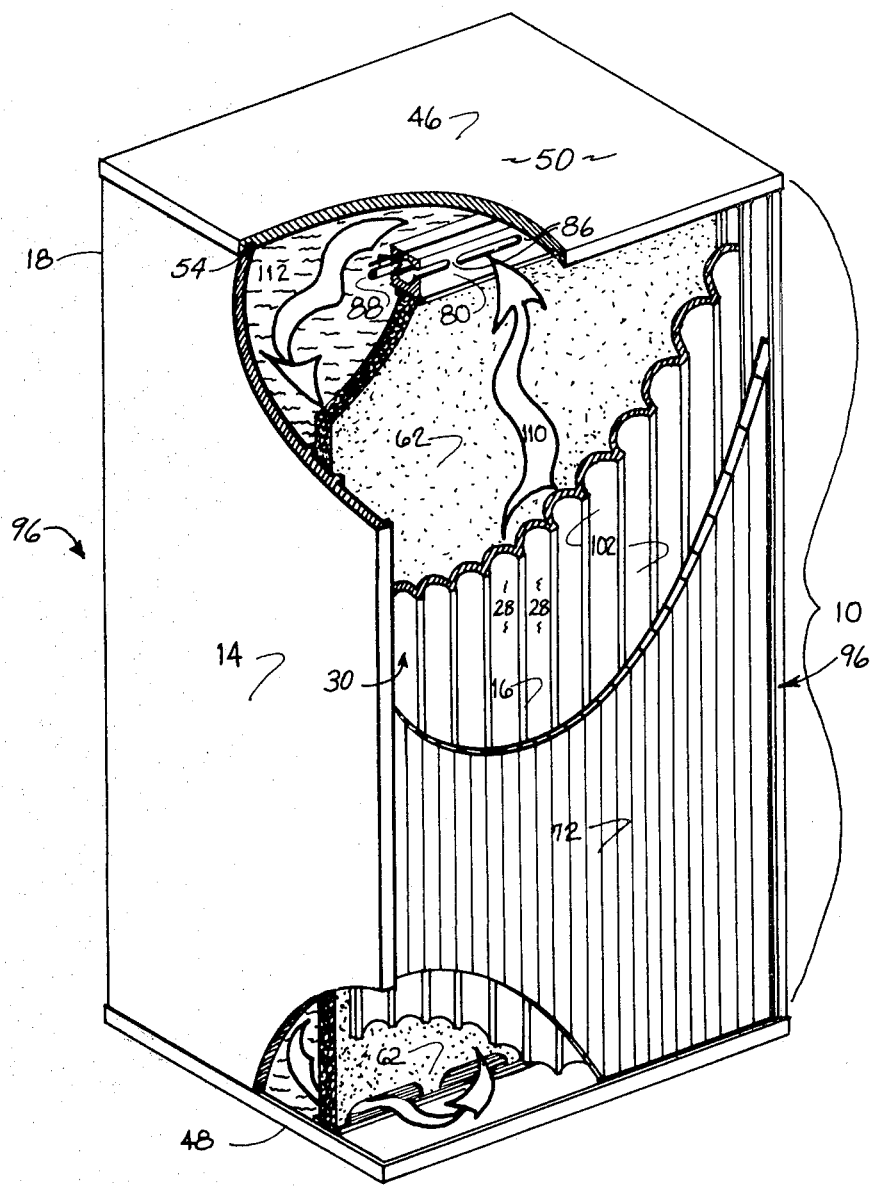
FIG. 4 is a fragmentary, partly cut-away and exploded perspective view of the upper portion of the module of FIG. 1, showing the extent of the check valve, and illustrating how the valve position is set for northern hemisphere winter operation.

Before assembly is completed, either the gap 64 at the bottom is provided with a one-way valve (not shown) or the gap 68 at the top is provided with a one-way valve 80. It is recommended that such valve be installed in the top gap, so the value is more accessible. As shown in FIGS. 1, 3 and 4, the check valve 80 extends from sidewall to sidewall and includes a generally internally oval, exteriorly rectangular cross-sectioned tubular housing 82, with a plurality of entrance and exit slots 84 separated by support webs 86. The valve member 80 is shown having the form of a horizontal rod 88 received in an oval chamber 90. An adjustable catch 92 is provided. Were it not for the catch 92, the valve rod 88 could roll or float to both inner and outer extremes of the chamber 90 to block either series of slots 84. The catch 92 is adjustable to permit the valve rod 88 to block only one series. Which series of slots 84 is blockable depends on the season. As illustrated in FIGS. 3 and 4 the catch is adjusted once at the beginning of each heating season and back at the beginning of each cooling season to change which series of slots 84 can be blocked and which series cannot be blocked by the valve rod 88. This effectively reverses the permitted flow direction of the one way valve 80.

Preferably the size and shape of the valve body 82 is such that it neatly occupies the space between the sidewalls in the grooves 38 from the upper edge of the panel 62 and to the underside of the cover 46.

Other designs of check valve could be used.

Figure 5:
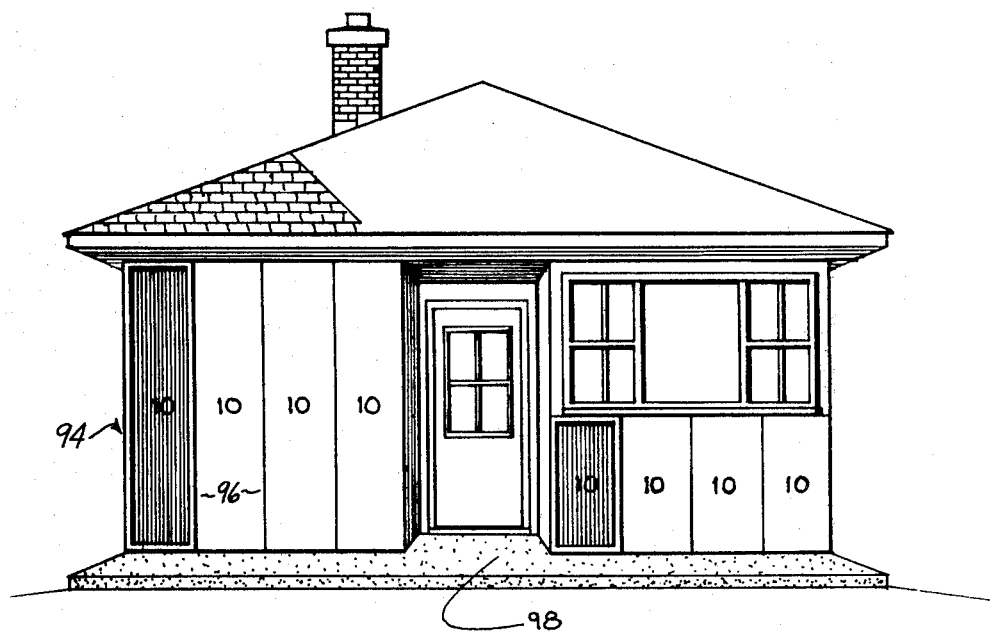
FIG. 5 is a smaller scale frontal perspective view in schematic form, of a building structure suggesting one way the module of FIG. 1 may be used with others similar to it, for providing the building structure with an environmentally driven heating and cooling system.

The module 10 is free-standing. Several of the modules 10 may be grouped side-by-side and incorporated in a building structure as shown in FIG. 5. The modules 10 may be used individually in building structures as well.

When incorporated in a building structure, each module 10 may present an internal finish to the room at 94, an external finish, i.e., glazing to the outdoors at 96, and embody between 94 and 96 a heating and cooling system 98 for the building.

The preferred heating and cooling system 98 now will be discussed in more detail.

Between the glazing panel 72, the front wall 16, the side wall fore-portions 20 and the top and bottom walls 46 and 48 there is defined an air space 100. Preferably, the outer surface 102 of the front wall 16, within the air space 100 is blackened to improve heat absorption. Also, preferably, the front wall 16 has the vertically fluted construction apparent from FIGS. 1, 2 and 4 showing a convoluted south facing surface which has the quality of increasing the surface area of the side exposed to the sun.

Further, such convoluted surface can involve a cross-sectional geometry that can enhance the collecting efficiency of the surface by offering a portion of its surface normal to the sun's rays, at early and late hours of the day as well as the otherwise more optimal noon hour.

A preferably relatively small-volume outer chamber 104 is defined between the back side of the collector wall 16, the panel 62, the side walls 14 and the top and bottom wall 46 and 48 The gaps 64 and 68 are in communication with the outer chamber 104, under and over the panel 62, respectively. (In the instance shown, the engagement of the stiffening corrugation 32 with the front side of the panel 62 divides the outer chamber 104 into two side-by-side lumens 106).

The remainder of the interior of the body 12, between the rear wall 18, the panel 62, the side walls 14 and the top and bottom walls 46 and 48 constitutes a preferably relatively large-volume inner chamber 108. The gaps 64 and 68 constitute flow paths for communicating the inner chamber 108 with the outer chamber 104. Typically, the ratio of volumes of the chambers 108 and 104 is 25:1, although it may vary, e.g. from 288:1, to 4:1.

During the heating season, catch 92 of the check valve 80 is adjusted as shown in FIG. 3 to provide a convection path indicated by the arrows 110 in FIG. 1.

The chambers 104, 108 are filled with liquid heat-transfer medium 112, e.g. water, to the level 114 indicated in FIG. 1. The medium 112, when heated by the sun's rays via the glazing panel 72 becomes differentially heated, and that sets up a convection circulation loop indicated by the arrows 110. The relatively hot medium flows upward in the outer chamber 104, through the gap 68 (via the check valve 80), and into the inner chamber 108. As the warmed medium flows into the inner chamber 108, relatively cooler water flows from the chamber 108, through the gap 66 and into the outer chamber 104. Thus, a liquid heat-transfer medium heated by the sun is removed by natural flow into storage on the room's side of the insulating panel 62. The check valve 80 prevents reverse flow. Storage of the heated liquid on the room's side of the insulating panel reduces nighttime heat losses.

The fins 28, corrugation 32 and corrugations 36 have the effect of increasing the surface areas of the respective heat transfer surfaces 102 and 94.

The valve member rod 88 rolls or floats in the chamber 90 in the direction of flow of thermosiphoning liquid heat transfer medium. When the catch 92 is set as in FIG. 3, flow may proceed, as described, in the direction of the arrows 110, because the catch 92 prevents the valve member rod 88 from moving further to seal the relatively downstream ports 84. However, should a tendency arise for convection in the reverse direction, the valve member rod 88 will roll or float in the new relatively downstream direction to close and seal the respective ports 84, broaching the provisional reverse circulation loop.

For each cooling season, the catch 92 is repositioned, as shown in FIG. 4, so that the reverse circulation loop formerly prevented becomes permitted, and the forward circulation loop (illustrated in FIG. 1) formerly permitted, becomes prevented. Thus, in the cooling mode, heated liquid heat transfer medium 112 at the top of the storage chamber 108 thermosiphons through the valve chamber 90 and into the outer chamber 104 where, especially on cool nights, it may be chilled by radiation. The cooled medium falls in the chamber 104 and circulates through the gap 64 back into the chamber 108. There, it picks up heat from the room and rises to the top of the chamber 108 ready for thermosiphoning as aforesaid.

In an outer loop, outside air may circulate into, through and out of the air space 100, via the vents 74, 76. The transfer of heat, especially in the cooling mode, can be enhanced by any means which increases air flow through the air space 100. For instance, a blower 116 may be arranged at 74, 76 or 100 to increase air flow and thus the cooling ability of the system 98.

For climates where the cooling mode, as so far described herein, would prove inadequate, the warm liquid heat transfer medium may be circulated out of the module(s) 10 during the coolest part of the night, sprayed in the air outdoors to effect evaporative cooling and to increase direct heat transfer surface area, and then the cooled liquid may be collected and returned to the module(s). A subsystem for accomplishing this is set forth in my aforementioned copending parent application.

For the panel 62, there may be used any thermal insulation material which remains stable over the long term in contact with the liquid heat transfer medium. For instance, where the liquid heat transfer medium is water, and the module 10 is incorporated in the south-facing wall of a building structure located in a climate where it is generally recommended that a south-facing residential building wall be so insulated as to have an R value of 10, the panel 62 may be a two-inch thick block of rigid polystyrene foam thermal insulation material having an R value of 10. Other thermal insulation materials can be used. The amount of insulation needed or that will prove ideal will, of course, vary from climate to climate.

The module 10 may be shipped to the job site in a folded, empty condition, then erected, completed and filled, in order to save space and cost during shipping.

Although the vents 74, 76 are shown conveniently being provided directly in the glazing panel 72, they may, of course, be provided in the building structure, or in the module, adjacent the glazing panel 72.

Although the catch 92 is described above as being subjected to manual adjustment between heating and cooling modes, automatic adjustment may be provided, e.g., as part of a comprehensive automatic control system such as is described in my aforementioned copending parent application.

It should now be apparent that the thermosiphoning module for environmentally driven heating and cooling system as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A thermosiphoning module for an environmentally driven heating and cooling system utilizing a heat-transfer liquid, said module comprising:
a hollow body defining a liquid-tight interior space;
a partition arranged within the hollow body for dividing the interior of the hollow body into an outer compartment and an inner compartment;
a first upper opening adjacent the top of the hollow body defining a liquid flow passageway past the partition intercommunicating the inner and outer compartments;
a second lower opening adjacent the bottom of the hollow body defining a liquid flow passageway past the partition intercommunicating the inner and outer compartments;
a check valve disposed in one said openings for restricting liquid flow to one direction in a loop defined by the inner and outer compartments and the upper and lower openings, said check valve including a generally tubular shaped housing having an internal chamber, two generally opposed series of slots extending through said tubular housing, each series including a plurality of slots, said series defining inlet and outlet ports to said internal chamber, respectively, and a buoyant rod-like member disposed within said chamber for controlling the flow of liquid through said valve by selectively blocking one of said inlet and said outlet ports; and
port means into said hollow body, for filling the body with said heat-transfer liquid for flow along said loop.

2. The module of claim 1, wherein:
said partition is constituted by a panel of thermal insulation material.

3. The module of claim 2, wherein:
the panel is a board of foamed synthetic plastic resin.

4. The module of claim 2, wherein:
said hollow body includes wall means providing an outer front wall and inner rear wall, two opposed sides, a cover and a floor, said panel terminating short of the cover and floor of the body and the upper and lower liquid flow passageways are defined as gaps over and under the upper and lower edges of the panel.

5. The module of claim 4, wherein:
said check valve further includes reversible catch means for selectively preventing said rod-like member from blocking said inlet ports or said outlet ports.

6. The module of claim 5, further comprising:
forward extensions of both said sides, extending said sides farther outwards than said front wall;
a glazing panel ranked before said front wall, defining a region therebetween;
said glazing panel being secured to said forward extesions, and
said module including upper and lower vents for communicating air between said region and the exterior of the module.

7. The module of claim 6, wherein:
said cover and floor also extend forwardly of said front wall and said glazing panel extends to said cover and said floor;
said upper and lower vents being defined through said glazing panel.

8. The module of claim 7, further including:
air pumping means associated with one of said upper and lower vents for forcing air in a circulation loop between the outside of the module and said region via said upper and lower vents.

9. The module of claim 6, wherein:
the volume and thickness of the inner compartment are substantially larger than the volume and thickness of the outer compartment.

10. The module of claim 9, further including:
a plurality of surface area-increasing rib means extending into said region from said front wall.

11. The module of claim 9, further including:
at least one rib means extending inwardly from said front wall into engagement with said panel intermediate the sides of the module body.

12. The module of claim 6, further including:
means defining opposed grooves on said forward extensions of said sides;
said glazing panel being received in and mounted by and between said opposed grooves.

13. The module of claim 6, further including:
means defining opposed grooves on said sides within said hollow body;
said panel of thermal insulation material being received in and mounted by and between said opposed grooves.

14. The module of claim 6, further including:
at least one stiffening, vertically extending support formed in each of said sides intermediate the thickness of said inner compartment.

15. The module of claim 6, further including:
a plurality of surface area-increasing fin means exteriorly presented on said inner wall.

16. The module of claim 15, wherein:
said inner wall is corrugated generally throughout, for providing said surface area-increasing fin means.

17. The module of claim 16, wherein:
said outer wall, inner wall and two opposed sides are constituted by a unitary member of constant transverse cross-sectional figure.

18. A building structure incorporating as part of a wall thereof at least one module of claim 6.

19. A reversible check valve for a liquid flow system comprising:
a generally tubular shaped housing having an internal chamber; two generally opposed series of slots extending through said housing, each series including a plurality of slots, said series defining inlet and outlet ports to said internal chamber and a rod-like member buoyant in said liquid, disposed within said chamber for controlling the flow of liquid through said valve by selectively blocking one of said inlet and outlet ports.

* * * * *